United States Patent
Brant

[19]

[11] Patent Number: 5,958,319

[45] Date of Patent: *Sep. 28, 1999

[54] POLYOELFIN FILMS HAVING INCREASED GAS PERMEABILITY AND METHOD FOR MAKING

[75] Inventor: Patrick Brant, Seabrook, Tex.

[73] Assignee: Exxon Chemical Patents, Inc., Baytown, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/686,042

[22] Filed: Jul. 24, 1996

[51] Int. Cl.⁶ .................................................. B29C 35/02
[52] U.S. Cl. .................... 264/177.19; 53/396; 53/432; 264/235; 264/346
[58] Field of Search ........................ 525/240; 526/345.1; 426/396, 392; 428/500, 515; 264/290.2, 346, 117.19, 235; 53/396, 432

[56] References Cited

U.S. PATENT DOCUMENTS

| | | | |
|---|---|---|---|
| 4,588,401 | 5/1986 | Kilkson | 604/408 |
| 4,696,857 | 9/1987 | Silbilia et al. | 428/323 |
| 4,876,146 | 10/1989 | Isaka et al. | 428/347 |
| 4,956,209 | 9/1990 | Isaka et al. | 428/35 |
| 5,187,917 | 2/1993 | Mykleby | 53/434 |
| 5,322,726 | 6/1994 | Dew | 428/216 |
| 5,411,805 | 5/1995 | Magill | 428/411.1 |
| 5,482,770 | 1/1996 | Bekele | 428/339 |
| 5,482,771 | 1/1996 | Shah | 428/349 |
| 5,491,019 | 2/1996 | Kuo | 428/213 |

FOREIGN PATENT DOCUMENTS

| | | |
|---|---|---|
| 0 471 607 A1 | 2/1992 | European Pat. Off. . |
| 0 687 558 A2 | 12/1995 | European Pat. Off. . |
| 1101950 | 2/1968 | United Kingdom . |
| WO 94/25271 | 11/1994 | WIPO . |
| WO 94/26816 | 11/1994 | WIPO . |
| WO 9526269 A1 | 10/1995 | WIPO . |
| WO 9713640 A1 | 4/1997 | WIPO . |
| WO 9728964 A1 | 8/1997 | WIPO . |

OTHER PUBLICATIONS

Schut, Jan H; "Enter a New Generation of Polyolefins", Plastics Technology, pp. 15–17, Nov. 1991.

"Modified Atmosphere Packaging Quality: The Value of Metallocene Resins", P.Brant, D.J. Michiels, R.W. Halle, and T.C. Erderly, Exxon Chemical Co., Baytown Polymers Center, Baytown, TX 77522, USA, Oct. 1995.

ANTEC '96, Orientation Determination and Morphological Study of High Density Poloyethylene (HDPE) Extruded Tubular Films, T. Yu and G.L. Wilkes, Dept. of Chemical Engineering, Virginia Tech, Blacksburg, VA 24061, pp. 2200–2204.

Primary Examiner—D. S. Nakarani
Assistant Examiner—D. Lawrence Tarazano
Attorney, Agent, or Firm—D. W. Miller

[57] ABSTRACT

Films, made of polyethylenes, and articles made therefrom exhibit, for a given density, improved oxygen transmission. The polyethylenes are produced in a metallocene-catalyzed production process. The films may be made by a cast film process, and may be made under conditions that raise the birefringence and the oxygen transmission rate of the film, such as increasing strain rate decreasing melt temperature, increasing quench rates, or may be post-extrusion treated, for instance annealed or cold drawn. Combinations of both extrusion techniques and post-extrusion techniques may also be used. Polyethylenes utilized for making such films typically have a Composition Distribution Breadth Index above 50%, a $M_w/M_n$ below 3, and a $M_z/M_w$ below 2. The permeability of the films so made will be 50% or more above the permeability of films based on similar resins based on previously used film formation techniques.

10 Claims, 2 Drawing Sheets

Fig. 2

POLYOELFIN FILMS HAVING INCREASED GAS PERMEABILITY AND METHOD FOR MAKING

TECHNICAL FIELD

This invention relates generally to polyethylene films having improved gas permeability and methods of making same. More specifically this invention is directed toward polyethylene films having increased gas transmission rates for a given density, while retaining good clarity and toughness, which will be of advantage in that such films can offer more desirable stiffness than has been previously available for a specific desirable gas transmission rate.

BACKGROUND

A relatively new and rapidly growing market for polyolefin films is the modified atmosphere packaging (MAP) of fresh fruits, flowers and vegetables (hereinafter "fresh produce"). The modified atmosphere is generally desired to both maintain freshness and extend shelf life for longer periods than has been previously possible. Successful MAP design requires the proper balance among the following properties: clarity (for retail sale most importantly), excellent hot tack, seal strength to minimize package leaks, good organoleptics (minimum interaction by flavor influencing materials with the packaged product either as donor or acceptor (scalper)) and extractibility, as well as a versatile range of oxygen and carbon dioxide transmission rates, usually coupled with good moisture barrier.

Fresh produce offers new challenges for the packaging industry. Among these challenges are the "living" nature of these to-be-packaged items. The term "living" signifies that a reverse photosynthesis begins to occur at the time of picking or cutting. Such reverse photosynthesis includes the absorbing of oxygen and the giving off of $CO_2$. MAP is based on knowledge of how a specific produce item's respiration rate responds to the atmosphere in which the produce resides. Proper choice of packaging materials can substantially extend the freshness, quality and shelf life. More extensive discussions of plant respiration may be found in "Postharvest: An Introduction to the Physiology and Handling of Fruits and Vegetables", AVI Publishing Co., Westport, Conn.

To successfully package various fresh produce, a container, film, or bag must have the ability to permit the passage of sufficient oxygen to substantially prevent the growth of anaerobic bacteria as such bacteria are among the causes of rotting or spoiling of fresh produce.

In the past, a film manufacturer has been limited in the ability to control or manipulate the permeability of a given film. Generally, the simplest, technique for obtaining increased permeability, has been to choose a lower density resin on which to base a film. However, selecting a lower density resin, while generally providing better clarity than higher density resins, has substantial practical problems, such a choice usually also leads to a softer film than higher density films. Such relative softness leads to an additional problem known as reduced machineability. Conversely, by increasing density to improve machineabliity and freshness perception, clarity and gas permeability have traditionally been diminished.

Therefore, a commercial need exists for films with an improved physical property balance and increased gas transmission rate. The increasing of the gas transmission rate for a polyethylene of a given density would advantageously provide the means for producing a film with a relatively high gas transmission rate characteristic of lower densities, while maintaining stiffness, clarity and overall film strength characteristic of higher densities.

SUMMARY

During the conversion of a polyethylene resin into a film, usually by an extrusion process, I have discovered that certain processing techniques can be employed during this conversion, that will have a substantial effect on enhancing and/or unexpectedly and surprisingly raising gas permeability of the film so produced. Additionally I have discovered that the optical birefringence of the film is a good indicator of the film's gas permeability. I have discovered that certain polyethylenes made using metallocene catalyst systems (hereinafter "m-polyethylenes") are particularly well suited to such processing techniques to produce films, having not only excellent stiffness, excellent clarity, low extractables, good physical properties, but higher gas transmission rates, when processed in such a way to have a birefringence in the ranges described herein. Such a combination of properties and methods of achieving same, have heretofore been unavailable. Several methods will be discussed to achieve such combinations. Accordingly, it will now be possible for a film manufacturer to establish different specific sets of processing parameters for a given m-polyethylene at a given density, to achieve different, higher gas transmission properties than heretofore thought possible for that density. I will show that for a given m-polyethylene resin density, the use of the processing techniques, will allow the film manufacturer to make films that can have substantially increased permeabilities for a given density. This will permit the film manufacturer to produce films, from a given m-polyethylene density to successfully package produce of higher respiration rates, than previously thought possible for the a given polyethylene resin density.

This surprising effect of process parameters means that film manufacturers must no longer depend upon lowering density or addition of layers of sometimes difficult to process resins, to achieve greater permeability while maintaining clarity, toughness, sealability and the like.

In certain embodiments of my invention an m-polyethylene resin is used in at least one layer of a film, or a bag or container made from such film. This m-polyethylene preferably with a density in the range of from 0.910–0.960, preferably 0.910–0.93 g/cm$^3$, and all elements included in such ranges, a $M_w/M_n$ less than about 3, a $M_z/M_w$ less than about 2.2, a $M_{z+1}/M_w$ less than about 3.5, and a composition distribution breadth index (CDBI) greater than 50%, preferably greater than 55%, more preferably greater than 60%, most preferably greater than 65%. Such films will have a birefringence above 5×10$^{-3}$. The film or container will have either a single layer or multilayer construction and the resin can be coextruded, laminated or blended with other materials, including other polyolefins.

In embodiments of my invention, methods of making a film having increased gas transmission rates at a given density are disclosed. Among the methods contemplated are, addition of a nucleating agent, rapid quenching of the melt during an extrusion, lowering melt temperature during extrusion, increased strain rates in the melt, and combinations of thereof. Further, certain post extrusion techniques may be used either alone or in combination with the film forming techniques to obtain the increased gas transmission rates. Among the post extrusion techniques contemplated are annealing, e.g. holding the film at an elevated temperature for a certain period of time, and/or cold drawing or orienting these post extrusion techniques can again be used in combination with one or more of the extrusion techniques. The films made utilizing one or more of these methods will have a gas transmission 50% greater than the gas transmission of conventionally made films where the conventionally made films follow the general equation $$\log P = [-17.2 \text{ (density)} + 18.5]$$

where P is the permeability in cc-mil/100 in$^2$-day (24 hrs)-atm @25° C.

BRIEF DESCRIPTION OF THE DRAWINGS

The foregoing aspects, features and advantages of the present invention will become clearer and more fully understood when the following detailed description, and appended claims are read in conjunction with the accompanying drawings, in which:

DETAILED DESCRIPTION

Introduction

This invention concerns methods of forming certain polyethylene films that will have unexpectedly high gas transmission rates and a high birefringence. Particularly useful in these methods will be m-polyethylenes.

In certain embodiments of the present invention, methods of achieving higher gas permeability of certain m-polyethylene films from a given density of m-polyethylene using the methods disclosed herein are also contemplated. This invention further includes certain m-polyethylenes, their conversion into fabricated articles such as film, articles made from such films, and applications in which such articles having relatively high gas transmission rates combined with good physical properties are desirable. The films made by techniques disclosed herein are particularly well suited for use in producing certain classes of films, film composites, bags or pouches made from the film or composite containers and articles made therefrom.

Principally these films and articles made from them, are used in packaging applications, specifically those applications requiring relatively high gas transmission rates, for example, in fresh produce packaging. The resulting films, composite films, or containers have combinations of properties rendering them superior and unique to films or film composites previously available.

In an embodiment of my invention, the films, when either formed utilizing specific techniques, or additionally or alternatively are further treated after film formation, would surprisingly and unexpectedly have high gas transmission rates for a given density when compared to a film made using previously available film formation and or post-film formation manipulation techniques, at the same or similar resin densities of m-polyethylenes. Following is a detailed description of certain preferred methods of forming films of polyethylenes, films, bags or containers made using these methods and articles made from the films or containers, that are within the scope of the present invention. Those skilled in the art will appreciate that numerous modifications to these preferred embodiments can be made without departing from the scope of the invention. For example, although methods of increasing gas transmission from low density m-polyethylenes, are exemplified herein, the methods will have numerous other uses and the films may be formed from other polyolefins or combinations thereof. To the extent my description is specific, it is solely for the purpose of illustrating preferred embodiments of my invention and should not be taken as limiting the present invention to these specific embodiments.

Production of the Films

Films contemplated by certain embodiments of the present invention may be made utilizing m-polyethylenes, by processes including, preferably, cast film manufacturing techniques. In such extrusion processes, the films of the present invention can be formed into a single layer film, or may be one layer or more of a multi-layer film or film composite. Alternatively, the m-polyethylene films described in this disclosure can be formed or utilized in the processes disclosed herein from a resin blend where the blend components can function to modify barrier, opacity, sealing, cost, or other functions. Both blend components and functions provided thereby will be known to those of ordinary skill in the art. Films of the present invention may also be included in extrusion coated or laminated structures. As long as a film, multi layer film, or container includes one or more m-polyethylene layers having the birefringence, gas transmission, haze, $M_w/M_n$, CDBI and the like, in the ranges described herein, it will be understood to be contemplated as an embodiment of the present invention. To achieve birefringence values and gas transmission rates discussed below, one or more film forming techniques and/or post extrusion techniques may be used.

During conversion of m-polyethylenes, into films, certain techniques may be used to enhance or increase the gas transmission rates for films made from a given m-polyethylene density such an increase has heretofore been unavailable. Combinations of methods of increasing the gas transmission of films based on a given density of m-polyethylene, will now permit the film fabricator to get out of the box previously forced upon the fabricators; namely, use of lower density, to achieve greater gas transmission. Substantially more latitude over the old paradigm of the lower density, the greater the gas transmission, is provided by the techniques described herein.

Persons of skill in polyolefin film formation techniques are aware that for a given extruder, certain operational parameters will optimize film formation. For example, extruder temperature profiles leading to a specific melt temperature, specific die openings, specific cooling regimens and the like are among the techniques used. Such parameters have been traditionally changed to accommodate changes to resin, or increased production rates for instance.

However, it has not previously been contemplated to utilize one or more of these process variables to greatly enhance (increase) the gas transmission of a film based on a given density m-polyethylene. I have discovered that lowering the melt temperature during the extrusion, increasing the strain rate of a melt during film formation, increasing the cooling rate (quench) of a formed film, or combinations of these techniques can have a marked effect on the gas transmission rate, dramatically raising the gas transmission rate. This discovery will permit the film maker to make films with substantially greater gas transmission rates from an m-polyolefin resin than by using previous techniques. By utilizing one or more of these process parameters, the film maker can achieve much higher gas transmission rates for the film so made, while still maintaining a good balance of physical properties.

I have additionally discovered that by utilizing one or more of the methods described herein for increasing gas transmission, the films based on m-polyethylene resins exhibit a sharp increase in birefringence. While the exact relationship between increased gas transmission and increased birefringence (at a given density) is not well developed, by measuring birefringence of a given film, a higher birefringence is an excellent indicator of increased gas transmission rates.

The birefringence of polyolefin films is discussed in Journal of Applied Polymer Science vol. I, issue no. 1, pages 91–100 (1959), and in Encyclopedia of Polymer Science and Engineering, Second Edition, Volume 10, pages 605–613.

Cooling Rate or Quench Rate/Lower Melt Temperature

In film extrusion, one method of increasing birefringence and thereby gas permeability, is rapid quench or increased cooling rates.

In cast film forming, such a rapid quench may be achieved in several ways, including but not limited to one or more of lowering chill roll temperature (e.g. by at least 5° C. from usual running conditions), decreasing the die to chill roll distance (for instance from 6 inches to 4 inches or less), lowering melt temperature (e.g. from 200° C. to 190° C. or less), increased line speeds (decreasing the time that the extrudate is at high temperature prior to being cooled on a chill roll) or combinations thereof.

In blown films, such a quench will mean reduction of the frost line height down to a minimum, by any of several techniques known by those of ordinary skill, such as use of chilled air. While commercial equipment for more rapid quench of the blown film melt is not common (such as water cooled mandrels, water cooled extrudate and the like) use of such techniques are also contemplated as methods to increase the birefringence, and thereby the gas transmission of a given resin film combination.

Strain Rate

Additionally, increasing strain rates of the melt during film formation will be effective in achieving some or all of the increased birefringence and increased gas transmission sought. Such strain rates may be induced by, for instance increasing the draw-down ratio by opening the die gap, or generally by increasing the ratio of die gap to film thickness. Usually, the greater the difference between die gap opening thickness and ultimate film thickness, the greater the strain rate.

An example of increasing strain rates in cast films is if for a given extruder the die gap is 10 mils and a 1 mil film is to be made therefrom, by increasing the die gap and/or lowering the film thickness, the strain rate is increased and a resultant improvement (increase) in both birefringence and gas transmission will be observed. As an example on a 6 in. (15.24 cm) cast film extruder a "normal" die opening for making a 1 mil film might be 10 mils. To achieve a higher strain rate, the die opening should be made larger in comparison with the final film thickness for instance 15, 20 or 25 mils.

Any of these techniques may be effective in increasing gas/OTR and birefringence, as well as combination of these techniques. Those of ordinary skill in the art will recognize that each extrusion set up, will have generally different possible variables. It is not my intention to suggest all possible variations as the number might be large. However, the skilled artesian will be easily able to take the direction provided above and the measurements provided below to achieve the desired result of greater gas/OTR and birefringence.

Addition of a Nucleating Agent

Nucleation by means of addition of nucleating agents ("clarifying" agent) is yet another method of reaching the birefringence sought. Of course, use of any or all of these techniques singly or in combination with one another or alternatively in combination with other techniques well known by those of ordinary skill in the art are among the contemplated techniques, as long as the sought birefringence or gas transmission is achieved. In certain embodiments of my invention, crystal nucleation may be [adventitious during] or after film formation. In addition to the well known nucleating agents, such as Millad® Sorbitol 3988 (available from Milliken Chemicals, Spartanburg, S.C.), adding tailored amounts of high molecular weight components preferably less than 5 weight percent, more preferably less than 3 weight percent, most preferably less than 1, may also effect the nucleation or achieve the end result, higher gas transmission and or higher.

Post Extrusion

Mechanical and/or thermal post extrusion techniques include annealing for various time and temperatures for instance, 8 hours at 40° C., preferably 16 hours at 40° C., more preferably 24 hours at 40° C., with or without negative air pressure (vacuum), and cold drawing of the film may also be used to achieve a desired birefringence. Longer annealing of several days or weeks may also achieve the desired degree of birefringence, but such longer annealing times may be economically prohibitive. Additionally, different temperatures may be used again as long as the desired birefringence and gas transmission values are achieved. The annealing should take place below the melting point of the film and preferably below the softening point of the film, preferably at least 40° C. below the melting point. Cold drawing, so called because the drawing takes place below the softening point of the film, may also be used to increase gas transmission rates. Such drawing may be uniaxial (either machine or transverse direction) or biaxial. Again, a combination of extrusion and post extrusion techniques may be used. While the mechanism that permits such films to exhibit increased gas transmission is not well understood, I show that row stacked lamellae formation and higher birefringence are indicators of embodiments of the invention and may be assisted or achieved by any or all of these techniques. It will be understood however, that generally no matter which technique or techniques are used, that the film, films, and/or containers so produced include the CDBI, molecular weight distributions, in at least one film or layer of a multi layer construction.

As is well known in the art, film density can differ from the density of the resin from which it was formed. Such differences may be due to crystal formation for instance when the melted resin is rapidly cooled or shock-cooled. Usually a film density will be lower than resin density, but the amount of reduction in density is often dependent upon the thermal history, any additives that would affect crystal formation, and the like. As discussed supra, unless otherwise indicated all densities referred to in the present description are resin (polymer) densities.

Properties of films produced from the resins

Figure 1:
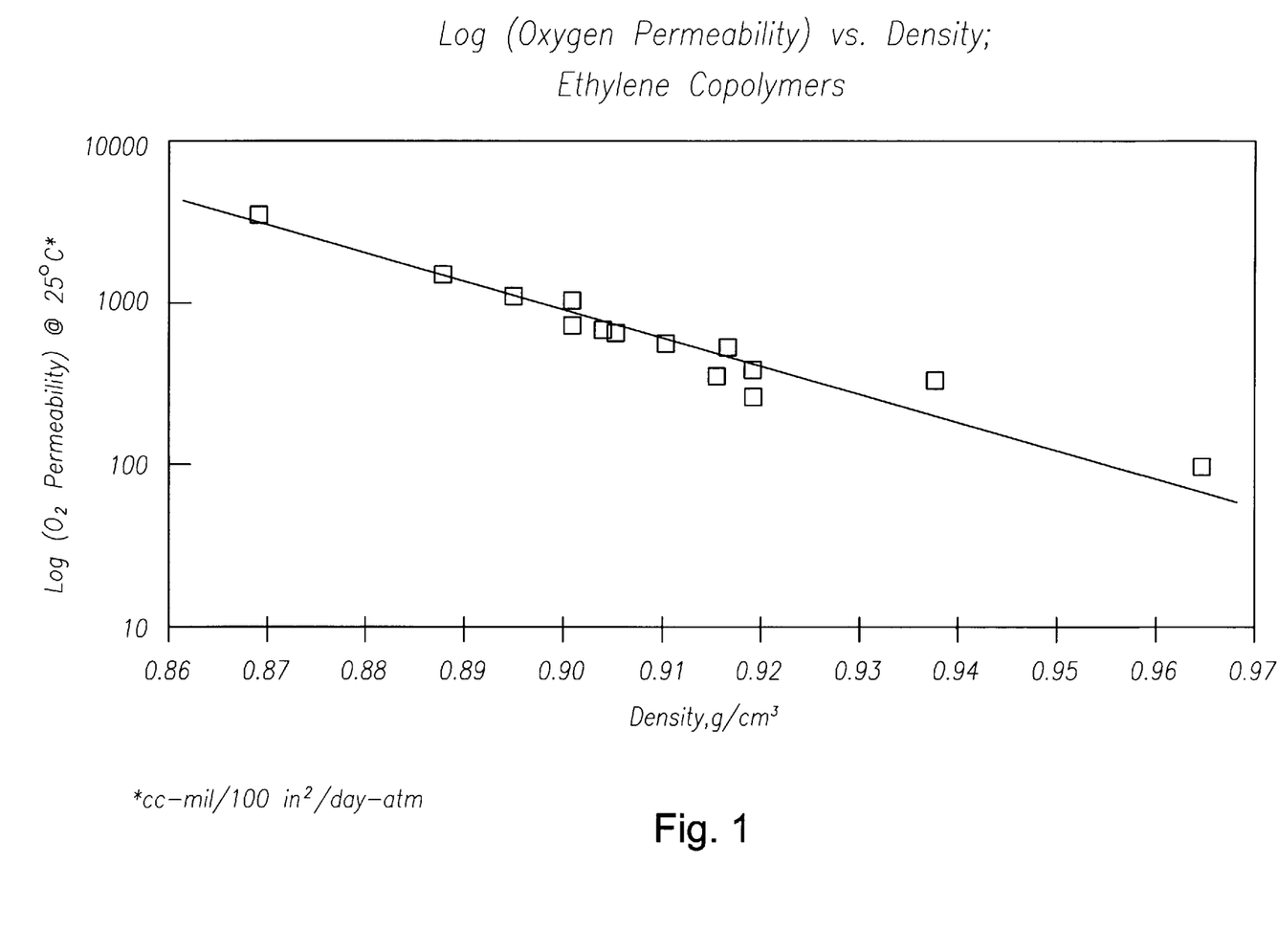
FIG. 1 illustrates the log of oxygen transmission rates as a function of film density for conventional processing techniques.
Figure 2:
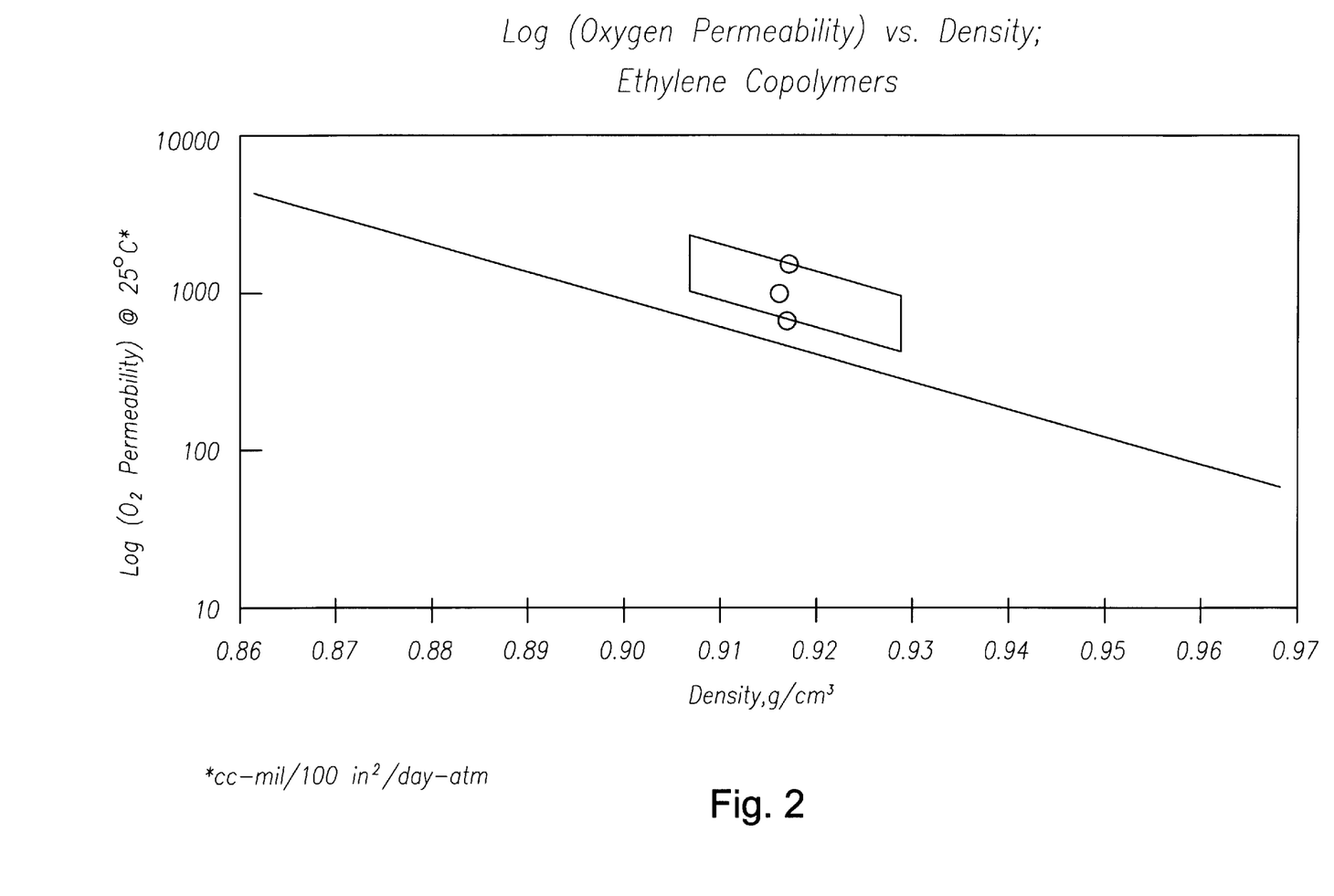
FIG. 2 illustrates the log of oxygen transmission rates as a function of density for both conventionally manufactured films and films utilizing the techniques of certain versions of the invention. The films utilizing the techniques of certain embodiments of this invention will have a gas transmission rate at least 50% greater than that of a film produced using conventional techniques based on a resin of the same density.

In an embodiment of the present invention, certain films and other fabricated articles have higher birefringence values and higher gas transmission rates, than achieved hitherto than comparable films and fabricated articles made using conventional film fabrication techniques utilizing m-polyethylene resins at the same or similar density. This can be seen in FIG. 1 which log plots P (permeability) as a function of film density. For the purposes of this description, gas permeability tests were performed on a MOCON Oxtran® permatron developed by Modern Controls, Inc. using ASTM F 372-73 at 25° C. (298° K) and 0 percent relative humidity.

The birefringence of films based on semi-crystalline or crystalline m-polyethylenes will begin to demonstrate the sought improved gas transmission at a level of birefringence above $5 \times 10^{-3}$, preferably above $6 \times 10^{-3}$, more preferably above $7 \times 10^{-3}$.

The use of the term gas transmission in this application is exemplified by oxygen transmission rate (OTR). However, the transmission of other gases or resistance to such transmission is well known in the art to be highly correlated with OTR depending upon the molecular weight shape and polarity (or solubility parameter) of the gas molecules, at the same test conditions. Accordingly, other gases that may be used in or present in modified or controlled atmosphere packaging include argon, helium, krypton, nitrogen, $CO_2$, hydrogen, the like. Their transmission rates through a barrier are also known as compared to oxygen transmission.

The films of an embodiment of the invention may have oxygen transmission rates above about 750 cc-mil/100 in$^2$/day-atm, or up to 1500 cc-mil/100 in$^2$/day-atm @25° C. For films based on m-polyethylene of from 0.915–0.925 g/cc. Specific permeabilities sought will depend on the type of produce being packaged, the length of time sought for shelf life, temperatures of storage, and other factors known to those of ordinary skill.

It is not beyond the scope of embodiments of my invention to blend or coextrude the m-polyolefins to form the films of the invention with other materials such as linear polyethylenes (HDPE, MDPE, LLDPE), low density polyethylene (LDPE), polypropylene (PP) (homopolymers and copolymers), polybutene-1 (PB), ethylene vinyl acetate (EVA), or other ethylene polar comonomer copolymers and the like to fabricate useful articles. Such potential blend or coextrudate polyolefins may be conventional Zeigler-Natta catalyzed, chromium catalyzed, free radical initiated, and the like. However, the birefringence of the layer or layers intended to control gas transmission should generally be within limits disclosed above. Additionally, any blend component or components additive or additives should be chosen such that the desired birefringence of the film remains at or above the targeted or desired value.

Definitions and Test Protocols

| Value | Units | Definition or Test |
|---|---|---|
| Density | g/cm$^3$ | ASTM D-792 |
| CDBI | % | *Definitions test determination contained in this application |
| Molecule weight distribution | none | |
| Haze | % | ASTM D-1003 |
| Gloss | % | ASTM D-2457 |
| Dart Drop Impact F$_{50}$ | g and g/mil | ASTM D-1709 |
| Puncture (peak and break energy) | lb. and in-lb./mil | Exxon method* |
| Oxygen transmission rate (oxygen permeability) | cm$^3$-mil/100 in$^2$-24 hrs. atm @ 25° C. | ASTM F372-73 |
| Tensile at Yield | psi | ASTM D-882 |
| Elongation at Yield | % | ASTM D-882 |
| Ultimate Tensile | psi | ASTM D-882 |
| Elongation at Break | % | ASTM D-882 |
| Secant Modulus (1%) | psi | ASTM D-882 |
| Elmendorf Tear g (g/mil) MD TD | | ASTM D-1922 |

*conversion factor to cc. mil/m$^2$/24 hrs.

Generally, m-polyethylenes have a narrow molecular weight distribution and narrow composition distribution, compared to polyethylenes produced from conventional Ziegler-Natta, or chromium based coordination catalysts.

It will be appreciated by those of ordinary skill in the art that the films of m-polyethylene resins of certain embodiments of the present invention, can be combined with other materials, depending on the intended function of the resulting film or container, composition or structure, or packages made from such films or containers. As an example of such combinations, cast films of low density polyethylene containing an ethylene vinyl acetate or other polar comonomer copolymer heat sealable coating or layer can be used. Such heat seal layers can be applied by any known manner to the m-low density polyethylene. For example, the heat seal layer can be applied or formed, by extrusion coating, coextrusion coating, or by coextrusion of the low density polyethylene with a heat seal material or materials. Other types of heat seal materials include but are not limited to ethylene copolymers with comonomers of vinyl acetate, ethylenically unsaturated acrylic acid esters such as ethyl acrylate, butyl acrylate, methyl acrylate, and/or acrylic acid, methacrylic acid, terpolymers including combinations of these monomers, ionomers based on acid conterpolymer, lower density (below 0.910 g/cm$^3$) ethylene α-olefin co or terpolymers (such as VLDPE, ULDPE an plastomers) and combinations thereof. However, m-polyethylene based films, such as those disclosed herein with high birefringence and gas transmission rates exhibit excellent heat sealing properties without any additional heat seal layer. Accordingly, a monolayer film possessing the birefringence and oxygen transmission rate.

Other methods of improving and/or controlling gas transmission properties of the film or container may be used in addition to the methods described herein without departing from the intended scope of my invention. For example, mechanical treatment such as, orienting, including additives to improve the gas permeability, such as, hydrocarbon resins and/or fillers.

Films or containers employing film and/or container manufacturing techniques disclosed herein and made from the resins (m-polyethylenes) of certain embodiments of the present invention can be oriented, or crosslinked just as may be done with films or containers made from previously available resins to impart different physical properties.

The films or composite structures described herein based on m-polyethylenes will be useful to package fresh produce including but not limited to cut or chopped lettuce, cabbage, carrots, celery, onions, apples, pears, bananas, melons, flowers, as well as produce known to have high respiration rates such as broccoli, cherries, mushrooms, and the like.

Crystallinity and Permeability

In the past, film gas permeability and crystallinity (and thereby density) have been considered to be closely related and followed well established relationships (Polymer Permeability, J. Comyn, Editor, Elsevier Appl. Science, 1985).

% crystallinity=(density (g/cc)−0.855)/0.145

Another formula of interest defines the permeability of most known polyethylenes as a function of film density where P is permeability in $cm^3$-mil/100 $in^2$-day.atm @25° C. and density is film density in g/cc:

log P=[−17.2(density)+18.5]  Formula I

Films made by techniques disclosed herein will generally have a permeability greater than 40% of the value described by Formula I, preferably 50% greater, more preferably 60% greater.

Generally, vide infra, higher crystallinity resins used to form films are less gas permeable than films based on lower crystallinity polyolefins. In this description I will show how films based upon relatively high crystallinity polyethylenes can be processed, generally during film forming and/or post film formation, to have gas permeability generally similar to films formed from substantially lower crystallinity (and lower density) polyethylenes. This is done while the films of embodiments of this invention maintain good optical properties, and good mechanical properties while retaining other useful film properties. This unexpectedly high permeability for a given film density has numerous advantages, such as superior stiffness in these films, compared to films made from the lower crystallinity polyethylenes, better machineability, and balanced toughness as measured by dart drop impact. It can be seen that stiffness, Elmendorf tear and OTR improve, while dart drop impact and puncture are not improved but remain acceptable, and haze and gloss are generally not measurably different where compared to films made using conventional processing techniques.

Polyolefin Resins Useful in Making Films of the Present Invention

There is a wide variety of commercial and experimental m-polyethylene resins useful in the manufacture of films included in certain embodiments of the present invention. A non-inclusive list is found below along with the general bulk resin properties as published:

TABLE A

| Commercial Designation | Density (g/cm$^3$) | Melt Index/ Melt Flow (g/10 min.) | Type |
|---|---|---|---|
| Exceed ® 103 (now 350L65 or 350D60)* | 0.917 | 1.0 | eth/hexene |
| Exceed ® 301 now 357C80* | 0.918 | 3.4 | eth/hexene |
| Exceed ® 377D60* | 0.922 | 1.0 | eth/hexene |
| Exceed ® 109* | 0.925 | 0.75 | eth/hexene |
| Escorene ® LL3001* | 0.918 | 1.0 | eth/hexene |
| Escorene ® LL3003* | 0.918 | 1.0 | eth/hexene |
| Exact ® 3028* | 0.900 | 1.2 | eth/butene |

*available from Exxon Chemical Co. Houston, TX, USA

It will be understood that in general I contemplate that a large number of m-polyethylenes will be useful in the techniques and applications described herein. Included components: ethylene-1-butene copolymers, ethylene-1-hexene copolymers, ethylene-1-octene copolymers, ethylene-4-methyl-1-pentene copolymers, ethylene dodecene copolymers, ethylene-1-pentene copolymers, as well as ethylene copolymers of one or more C4 to C20 containing alpha-olefins, diolefins, and combinations thereof. A nonexclusive list of such polymers; ethylene, 1-butene, 1-pentene; ethylene, 1-butene, 1-hexene; ethylene, 1-butene, 1-octene; ethylene, 1-butene, decene; ethylene, 1-pentene, 1-hexene; ethylene, 1-pentene, 1-octene; ethylene, 1-pentene, decene; ethylene, 1-octene; 1-pentene; ethylene 1-octene, decene; ethylene, 4-methyl-1-pentene, 1-butene; ethylene 4-methyl-1-pentene, 1-pentene; ethylene, 4-methyl-1-pentene, 1-hexene; ethylene 4-methyl-1-pentene, 1-octene; ethylene, 4-methyl-1-pentene, decene. Included in the ethylene copolymers will be one or more of the above monomers included at a total level of 0.2 to 6 mole percent, preferably 0.5 to 4 mole percent, or such mole percents consistent with the resin densities contemplated.

Densities contemplated include, but are not limited to, 0.90 g/cc–0.940 g/cc, preferably 0.905 to 0.935, more preferably 0.910 to 0.930, most preferably 0.912 to 0.925 g/cc. Densities referred to herein will generally be polymer or resin densities, unless otherwise specified.

Generally the m-polyethylenes contemplated have a molecular weight distribution, as determined by the ratio of weight average molecular weight to number average molecular weight ($M_w/M_n$) of less than 3, preferably less than 2.5. Additionally such m-polyolefins will have a ratio of $M_z$ average molecular weight to $M_w$ of less than 2.

Additionally such m-polyolefins will have a composition distribution breadth index (CDBI) of 50% or greater, preferably greater than 55%, more preferably greater than 60%, most preferably greater than 65%. Definitions and methods of determination of CDBI may be found in U.S. Pat. No. 5,008,204 which is fully incorporated by reference herein for purposes of U.S. patent practice.

The resin and product properties recited in this specification were determined in accordance with the following test procedures. Where any of these properties is referenced in the appended claims, it is to be measured in accordance with the specified test procedure.

TABLE B

| Property | Units | Procedure |
|---|---|---|
| Melt Index | dg/min | ASTM D-1238(E) |
| Density | g/cc | ASTM D-1505 |
| Tensile @ Yield | psi | ASTM D-882 |
| Elongation @ Yield | % | ASTM D-882 |
| Tensile @ Break | psi | ASTM D-882 |
| Elongation @ Break | % | ASTM D-882 |
| 1% Secant Modulus | kpsi | ASTM D-882 |
| Dart Impact Strength | g/mil | ASTM D-1709 -75, method A |
| Elmendorf Tear Resistance | g/mil | ASTM D-1922 * -85 |
| Total Energy Impact | ft-lb | ASTM D-4272 |
| Oxygen Transmission Rate | cc mil at 25° C./100 in²/atm day | ASTM F 372-73 |

* Lowest reading, not average.

EXAMPLES

Example 1–7

Examples 1–7 were fabricated from the resins listed in Table A on a Killion cast coextrusion line with 3 extruders, 1×1 inch, 2×¾ inch extruded at the processing conditions listed in Table I (Extruder speeds for each layer (3 layers), distance to chill roll, line speed, morphology, die gap, film thickness, melt temperature and oxygen transmission ratio are shown in table 1.)

(NOTE: "stacked ⊥ to MD" indicates the lamellae were stacked substantially perpendicular to the machine direction of the extrusion).

From the data on Table 4 for each of these examples run, it can be seen that in Example 1, 2; and 3, as extruder speed goes down (Examples 1 & 2 compared to Example 3) and line speed is increased, birefringence and OTR rise and the morphology changes (from random to stacked)

While at the same extruder speed (Example 1 & 2) the farther the distance to the chill roll the lower the OTR (Example 2 compared to Example 1)

The morphology shown in Table 4 shows a substantial effect on permeability. Film of Example 3 has a resin density of 0.917 g/cm³ but has an oxygen permeability usually associated with films made from resins having a density of about 0.89 g/cm³.

Examples 8–10

Subsequent to the experiments run (examples 1–7) above, a similar m-polyolefin Exceeds® 301 (0.918 g/cm³, 3.4 melt index) was run on a larger scale extruder (Black Clawson coextruder, 1×3½ inch, 2×2½ inch). Nominal 0.8 mil films were cast with both relatively small and larger die gaps. The films were made both with and without a nucleating agent (Millad® Sorbitol 3998, at 0.25 weight percent). All m-polyolefin samples were compounded with 500 ppm erucamide, 2000 ppm talc (anti-block) as well as nucleating agent, in Examples 9 and 10. A summary of extruder run conditions and the resulting oxygen permeabilities of the films is shown in Table 2. As seen from the table, little change in OTR is attributed (in these runs) to nucleation (Examples 8 and 9) and similarly with die gap (Examples 9 and 10). One possible difference of note between the run sets of Examples 1–7 and those of Examples 8–10 is melt temperature. Examples 1–7 were run at a melt temperature of 175–180° C., compared with Examples 8–10 run at a more standard extruder profile with a melt temperature of about 200° C.

Examples 8A–8D

Subsequent to extrusion, the film generated under conditions outlined for Example 8, is thermally treated. Table 3 shows the effect of the heat treatment. Example 8A is the film of Example 8, not aged, e.g. 8–24 hours old when measured. Example 8B is the film of Example 8, aged at room temperature (25° C.) for two weeks and shows less than 1% change in OTR, over substantially unaged film (8A). By contrast, Examples 8C and 8D aged at 40° C. respectively for 1 and 4 days (24–96 hours) show an approximate 25% increase in OTR after the thermal treatment. As will be noted, the film density, as expected, increases, about 3 (8D) to 5 (8C) percent. Ordinarily the increase in density is associated with a slight decrease in OTR.

TABLE 1

Effect of Morphology on Permeability[a] Cast Films

| Example | Resin | Extruder Speeds (rpm) Core/Skin/Skin | Dist. to Chill Roll (in)(cm)/ Line Speed (fpm)(mpm) | Morphology TEM | OTR 25° C. |
|---|---|---|---|---|---|
| 1 | SLP-402B[1] | 49/19/19 | (5) 2/28 (8.5) | | 630 |
| 2 | SLP-402B[1] | 49/19/19 | (15) 6/28 (8.5) | Random | 594 |
| 3 | SLP-402B[1] | 11/19/19 | (15) 6/57 (17.3) | stacked ⊥ MD | 1413 |
| 4 | Escorene ® LL3001 | 50/18/20 | (15) 6/42 (12.8) | stacked ⊥ MD | 795 |
| 5 | Escorene ® LL3001 | 50/20/20 | (5) 2/32 (9.75) | stacked ⊥ MD | 912 |
| 6 | EXCEED ® 103 | 10/5/5 | <1 | Random | 595 |
| 7 | EXCEED ® 103 | 0/26/26 | <1 | stacked ⊥ MD | 952 |

[1]earlier designation of Exceed ® 103
[a]For all the films above: target film thickness 1 mil (0.00254 cm); chill roll temperature was 68° F. (20° C.); die gap set at minimum accessible 0.008 (0.02 cm)". Melt temperature for examples 1, 2, 3, and 4 are 350° F., while those for examples 5 and 6 are 360° F.

TABLE 2

| Example | Die Gap, mil(cm) | Line Speeds (fpm*/mpm) | Δ Distance, in. (Die Gap - Chill Roll) | Nucleated (Y/N) | OTR @ 25° C. |
|---|---|---|---|---|---|
| 3 | 40 (0.10) | 1000/1000 | Minimum | N | 790 |
| 9 | 40 (0.10) | 1000/1000 | Minimum | Y | 770 |
| 10 | 20 (0.005) | 1000/1000 | Minimum | Y | 732 |

*feet per minute/meters per minute

TABLE 3

Effect of Aging and Thermal Treatment on Permeability

| Example | Thermal Treatment, Days @ 40° C. | OTR @ 25° C. | Film Density, g/cm$^3$ |
|---|---|---|---|
| 8A; freshly cast | 0 | 789 | — |
| 8B; 2 weeks old | 0 | 795 | 0.9079 |
| 8C | 1 | 989 | 0.9123 |
| 8D | 4 | 986 | 0.9106 |

TABLE 4

| Example | Resin | MI g/10 min/Density (g/cc) | Film Extender | Birefringence (× 10$^3$) | Morphology TEM (a) | OTR @ 25° C. (b) |
|---|---|---|---|---|---|---|
| 1 | SLP-402B | 1/0.917 | | — | — | 630 |
| 2 | " | " | Killion | 1.64–2.16 | random | 594 |
| 3 | " | " | " | 10.5–12.4 | stacked | 1200 |
| 5 | LL3001 | 1/0.918 | " | — | stacked | 912 |
| 6 | ECD103 | 1/0.918 | " | — | random | 595 |
| 7 | ECD103 | 1/0.915 | " | — | stacked | 952 |
| 8 | 301 | 3/0.918 | Black-Clawson | 6.9–7.2 | stacked | 795 |
| 9 | 301 | 3/0.918 | " | 8.5–10.1 | — | 770 |
| 10 | 301 | 3/0.918 | " | 5.5–6.3 | — | 732 |
| 11 | LL3105 | | Egan | | | |
| 12 | LL3002 | 2/0.918 | Black-Clawson | — | — | 787 |
| 13 | ECD-301 | 3/0.918 | Black-Clawson | — | — | 775 |

(a) TEM = transmission electron microscope
(b) cc-mil/100 in$^2$ - day (24 hrs) - atm While the present invention has been described and illustrated by reference to particular embodiments thereof, it will be appreciated by those of ordinary skill in the art that the invention lends itself to variations not necessarily illustrated herein. For example, it is not beyond the scope of this invention to include additives with the claimed films or containers or to blend or coextrude resins to form the claimed films or containers with other polymers or even laminate the claimed films to other materials such as metal foils, paper, other polymer films and combinations thereof. For this reason, then, reference should be made solely to the appended claims for purposes of determining the true scope of the present invention.

I claim:

1. A process for making a polyethylene film having a high oxygen transmission rate comprising:

a) melt extruding a polyethylene to form at least a single layer film with a thickness in the range of from 0.25–3 mils, wherein said polyethylene has a $M_w/M_n$ below 2.5, a density in the range of 0.90–0.925 g/cc and a CDBI above 60%;

b) annealing the formed film at a temperature and for a period from about sufficient to increase the permeability by at least 50% over the permeability described by the equation:

$$\log P=(-17.2(\text{density})+18.5)$$

wherein said film has a birefringence greater than $5\times10^{-3}$; and a haze of less than 7%.

2. The process of making a polyethylene film of claim 1 wherein said film is extruded to a film not exceeding 2 mils and said annealing takes place for at least 8 hours at a temperature at least 40° C. below the polyolefin melting point.

3. A process of claim 1 further comprising wrapping produce in said film.

4. The process of claim 3 wherein said produce is selected from the group consisting of apples, pears, broccoli, cherries, mushrooms, lettuce, cabbage, flowers and combinations thereof.

5. A process for making a polyethylene film having a high oxygen transmission rate comprising:

a) melt extruding a polyethylene to form at least a single layer film with a thickness in the range of from 0.25–3 mils, wherein said polyethylene has a $M_w/M_n$ below 3, and a density in the range of 0.90–0.935 g/cc, wherein said oxygen transmission is achieved by a method selected from the group consisting of lowering the melt temperature during the extrusion, increasing the strain rate of a melt during film formation, increasing the cooling rate (quench) of a formed film, and combinations of these techniques; whereby oxygen transmission rate is increased by at least 50% over oxygen transmission rate as represented by permability over the permeability described by the equation:

$$\log P=(-17.2(\text{density})+18.5).$$

6. The process of making a polyethylene film of claim 5 wherein said film is extruded to a film not exceeding 2 mils.

7. The process of claim 5 further comprising wrapping produce in said film.

8. The process of claim 7 wherein said produce is selected from the group consisting of apples, pears, broccoli, cherries, mushrooms, lettuce, cabbage, flowers and combinations thereof.

9. The process of claim 5 wherein said polyethylene film has:
   a) a birefringence greater than $5 \times 10^{-3}$;
   b) a haze of less than 7%;
   wherein said film is based on a polyethylene resin having:
   c) $M_w/M_n$ less than 2.5;
   d) a density in the range of $0.910$–$0.925$ kg/cm$^3$; and
   e) a CDBI greater than 60%.

10. The process of claim 5 further comprising covering produce with said polyethylene film.

* * * * *